United States Patent Office 3,378,343
Patented Apr. 16, 1968

3,378,343
PROCESS FOR THE PREPARATION OF
BERYLLIUM OXIDE
Alain Baur, Paris, and Alfred Lecoco, Saint-Maur, France, assignors to Commissariat à l'Energie Atomique, Paris, France
No Drawing. Filed Mar. 19, 1964, Ser. No. 353,237
Claims priority, application France, Dec. 11, 1963, 956,787
3 Claims. (Cl. 23—183)

The present invention relates to a process for the preparation of beryllium oxide.

Processes for the preparation of beryllium oxide have developed to a marked extent during the past few decades as a result of the increasing prominence which has been given to the fabrication of sintered products of beryllia and to their utilization in the nuclear industry. The very low neutron capture cross-section of beryllium oxide and its high melting point make this latter particularly valuable as a structural material in nuclear reactors.

The most commonly employed processes for the preparation of beryllium oxide are based on the decomposition by calcination of beryllium compounds, for example beryllium sulphate or beryllium hydroxide. The salt or hydroxide is dissociated under the action of heat, thus producing beryllia (beryllium oxide) and gases which are more or less corrosive depending on the nature of the starting product. This pyrolysis can be conducted in free air or in a controlled atmosphere or nitrogen, hydrogen or argon.

However, these processes of decomposition at atmospheric pressure are subject to the following disadvantages: they call for a high temperature which often reaches 1,000° C. and even higher (decomposition of beryllium sulphate), the calcination process is accompanied by a loss of product which is carried away by the hot gases, thus setting difficult problems in connection with the protection of personnel on account of the high toxicity of beryllia.

The present invention supplies a remedy to the disadvantages noted above and is accordingly directed to a process for the preparation of beryllium oxide by decomposition of beryllium hydroxide at relatively low temperature. The invention permits the possibility of producing beryllium oxide with a high quantitative yield while minimizing the problems involved in personnel safety by eliminating the presence of gases produced by decomposition of the hydroxide which is employed.

This process essentially consists in carrying out the decomposition of beryllium hydroxide having indifferent physical properties by hydrothermal treatment under pressure, the heating temperature being at least equal to 225° C.

The remarkable value of the standard entropy of beryllium hydroxide which the inventors have found by experiment to be equal to 11.18±0.97 calories/degree-molecule led them to the assumption that the decomposition reaction of beryllium hydroxide could be conducted in a sealed vessel under certain conditions of temperature and pressure. It is deduced therefrom that the pressure of the steam evolved during the decomposition reaction:

$$Be(OH)_2 \rightarrow BeO + H_2O$$

is given by the equation:

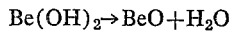

$$\log_{10} P = 10.541 - 3.137\, T^{-1}$$

wherein P is expressed in millimeters of mercury and T in degrees Kelvin.

The process in accordance with the invention is especially characterized in that the decomposition takes place within a sealed vessel irrespective of the physical properties of the starting hydroxide and the type and shape of the vessel, said vessel being nevertheless necessarily formed of a suitable material which is not liable to modify the initial purity of the product.

At a temperature below 225° C., in accordance with the equation which is given above, the decomposition of the hydroxide cannot take place in a medium of saturated steam. There is observed under these conditions the allotropic transformation of the light hydroxide of beryllium into its dense form or into a blend of light form and dense form, as described in the co-pending patent application Ser. No. 353,259 filed by applicants on Mar. 19, 1964.

At temperatures above 225° C., decomposition is obtained in an aqueous medium whether saturated or unsaturated, the steam pressure of the decomposition water being always higher than the pressure of saturated steam given off by the pure addition water.

The kinetic energy of decomposition of beryllium hydroxide at temperatures above 225° C. is higher than that of the allotropic transformation of the light form into the dense form. At temperatures below 225° C., the speed of decomposition is slow. Accordingly, it is always preferable to work at a higher temperature and in the presence of water in both liquid and gaseous states if rapid decomposition of beryllium hydroxide is desired.

X-ray analysis of beryllium oxide as obtained by hydrothermal decomposition under pressure in accordance with this patent application shows that the starting hydroxide has completely disappeared if the heating time is of sufficient duration.

Since a small proportion of the decomposition water, the quantity of which is a function of the thermal conditions of decomposition, is liable to remain in the oxide lattice which is formed, it is an advantage to subject the product after treatment to a subsequent heating which rapidly eliminates this water.

The choice of material which constitutes the apparatus, which can be a conventional autoclave, is dictated by the need to avoid any modification in the purity of the starting product.

A better understanding of the present invention will be had by consideration of the examples which follow below. Said examples provide a precise definition of the operating conditions governing the modes of practical application of the process according to the invention. The constructional arrangements which will be described in connection with these examples must be considered as forming part of the invention, it being understood that any equivalent arrangements can equally well be utilized without thereby departing from the scope of the invention.

Example 1

There has been placed in a nickel autoclave beryllium hydroxide in light form and a sufficient quantity of water to produce at the temperature which is contemplated a medium of saturated steam (liquid phase and vapor phase).

Five successive tests have been performed by placing the autoclave in an isothermal furnace at 240° C. These tests have shown that a treatment time of 2 hours was sufficient to decompose the beryllium hydroxide into beryllium oxide.

In this series of tests, the pressure reached was 34 bars. Examination of the products obtained by X-ray diffraction shows that only the characteristic lines of the oxide remain in the case of treatment times longer than 2 hours.

Thermogravimetric analysis reveals that 17% of the initial hydroxide appears to retain water in a disordered state such that subsequent heating does not indicate the usual characteristics of decomposition of hydroxides.

Example 2

In an autoclave with internal chamber of Pyrex glass, there has been introduced amorphous beryllium hydroxide and quantities of water so calculated as to be below saturation pressure at the temperature which was contemplated. Three preparations were effected at steam pressures of 25, 36 and 45 bars. The decomposition temperature was fixed at 263° C. The product obtained had a gelatinous appearance and solely consisted of beryllium oxide.

Example 3

In an autoclave of stainless steel, there was placed beryllium hydroxide having an alpha allotropic form together with a sufficient quantity of water to ensure that the liquid phase and vapor phase should be present at the temperature of the experiment. It is observed after a certain heating time that the beryllium hydroxide is decomposed into beryllium oxide and water in accordance with the reaction hereinabove described.

In the case of this preparation, the temperature was 280° C.; the pressure reached was in the vicinity of 65 bars, the heating time was 4 hours. Every organized crystal form containing both BeO and $H_2O$ has disappeared.

Only beryllia is observable by X-ray diffraction. Approximately 9.3% of the starting hydroxide shows a certain retention of water which can readily be eliminated by subsequent heating.

Example 4

During a similar preparation carried out in quartz consisting in heating for a period of eight hours at 280° C. followed by 36 hours at 190° C., it was thus observed that the decomposition reaction is non-reversible. The product obtained was in fact solely composed of BeO as identified by the Debye-Scherrer test. The quantity of water retained was slightly smaller, which appears to show that the reaction time has relatively little influence.

What we claim is:

1. Process for preparation of beryllium oxide which comprises heating beryllium hydroxide under pressure in a sealed vessel in the presence of an added quantity of water at a temperature between 225–280° C. such that the steam pressure of the water of decomposition is higher than the pressure of the steam given off by the added quantity of water for a time sufficient to decompose the beryllium hydroxide to beryllium oxide.

2. Process for the preparation of beryllium oxide in accordance with claim 1, the decomposition being achieved in saturated steam.

3. Process for the preparation of beryllium oxide in accordance with claim 1, the decomposition being achieved in nonsaturated steam.

References Cited

UNITED STATES PATENTS

| 3,025,137 | 3/1962 | Murray et al. | 23—183 |
| 2,641,611 | 6/1953 | Kawecki | 23—183 X |

OTHER REFERENCES

Pascal, Nouveau Traite de Chimie Minerale, vol. 4, page 59, Parris, 1958.

EDWARD J. MERCOS, *Primary Examiner.*

OSCAR R. VERTIZ, *Examiner.*

J. J. BROWN, *Assistant Examiner.*